US006183093B1

(12) United States Patent
Sawai (10) Patent No.: US 6,183,093 B1
(45) Date of Patent: Feb. 6, 2001

(54) LIGHT SOURCE DEVICE AND AN ILLUMINATOR AND AN IMAGE PROJECTOR

(75) Inventor: Yasumasa Sawai, Sakai (JP)

(73) Assignee: Minolta Co., Ltd., Osaka (JP)

( * ) Notice: Under 35 U.S.C. 154(b), the term of this patent shall be extended for 0 days.

(21) Appl. No.: 09/150,528

(22) Filed: Sep. 10, 1998

(30) Foreign Application Priority Data

Sep. 12, 1997 (JP) .................................................. 9-248892
Jul. 28, 1998 (JP) ................................................. 10-213208

(51) Int. Cl.$^7$ .................................................. G03B 21/00
(52) U.S. Cl. .................................. 353/31; 353/34; 353/37
(58) Field of Search .................................... 353/31, 34, 37, 353/53; 349/61, 62, 63, 64; 359/619

(56) References Cited

U.S. PATENT DOCUMENTS

| 4,726,662 | * | 2/1988 | Cromack | 350/345 |
| 4,936,659 | * | 6/1990 | Anderson et al. | 350/339 |
| 5,626,409 | * | 5/1997 | Nakayama et al. | 353/31 |
| 5,743,612 | * | 4/1998 | Matsuda et al. | 353/97 |
| 5,801,795 | * | 9/1998 | Ogino | 349/5 |
| 5,805,337 | * | 9/1998 | Yoshida | 359/495 |
| 5,815,249 | * | 9/1998 | Nishi et al. | 355/71 |
| 5,917,561 | * | 6/1999 | Hatanaka | 349/8 |

FOREIGN PATENT DOCUMENTS

| 6-265887 | 9/1994 | (JP) . |
| 7-181392 | 7/1995 | (JP) . |

* cited by examiner

Primary Examiner—Safet Metjahic
Assistant Examiner—E P LeRoux
(74) Attorney, Agent, or Firm—Sidley & Austin (57) ABSTRACT

A light source device for an image projector includes: two light sources for irradiating illumination light rays; a light distributor for receiving light rays from each of the two light sources, and sending out light rays of each of the two light sources parallel to an optical axis of the projector in a uniform distribution pattern from an entirety of an emerging surface of the light distributor. Each of the two light sources irradiates light rays in a direction inclined with respect to the light distributor so that light rays irradiated by each of the two light sources are incident onto the entire incident surface of the light distributor.

22 Claims, 7 Drawing Sheets

LIGHT SOURCE DEVICE AND AN ILLUMINATOR AND AN IMAGE PROJECTOR

This application is based on patent application Nos. 9-248892 and 10-213208 filed in Japan, the contents of which is hereby incorporated by reference.

BACKGROUND OF THE INVENTION

This invention relates to a light source device, an illuminator for a projector of a ray splitting type using a dichroic mirror for color separation, and an image projector provided with such an illuminator.

As optical image projectors, there have been marketed liquid crystal projectors. A liquid crystal projector acts as a means for displaying a large image. The projector enlargedly projects an optical image on a screen via a projection lens. The optical image emerges from liquid crystal panels after modulation of the luminance of illumination light in accordance with an image signal.

Figure 6:
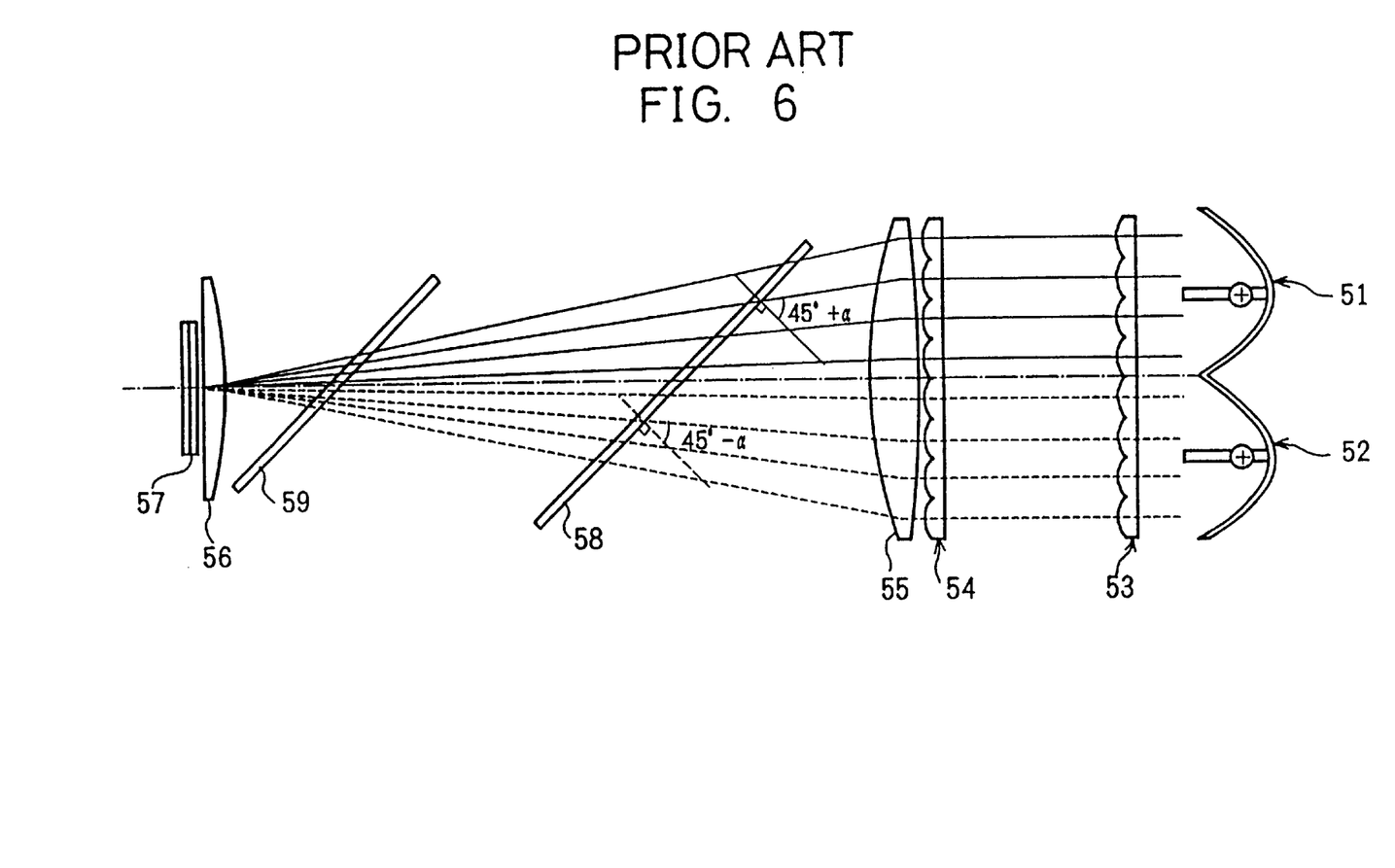
FIG. 6 is a schematic diagram showing a construction of an illumination optical system in a conventional liquid crystal projector.

A schematic construction of an illumination optical system of such a liquid crystal projector is described with reference to FIG. 6. In FIG. 6, white light is irradiated from lamps (light sources) 51, 52 disposed in a vertical direction. Parallel light rays are directed onto a first lens array 53. In this construction, parallel light rays of the lamp 51 are substantially incident onto an upper portion of the first lens array 53 while parallel light rays of the lamp 52 are substantially incident onto a lower portion of the first lens array 53.

These parallel light rays are further bundled by the first lens array 53 and a second lens array 54 each including a plurality of lenses, and are incident onto a display screen of a liquid crystal panel 57 in a superposing manner via an integrating lens 55 and a field lens 56. The first lens array 53, the second lens array 54, and the integrating lens 55 constitute an optical integrator.

Figure 7:
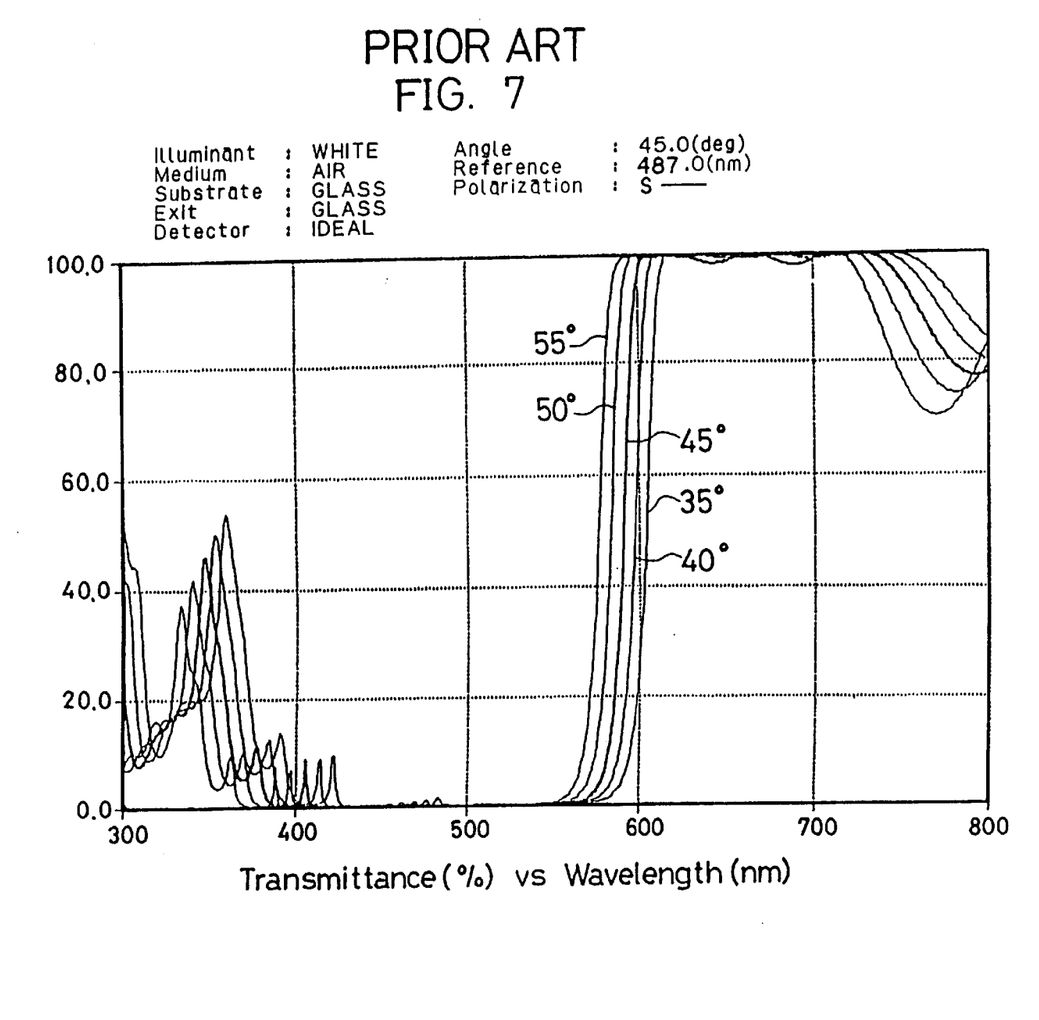
FIG. 7 is a graph showing incident angle characteristics of one dichroic mirror constituting a color separating optical system in terms of a relationship between transmittance and wavelength in the conventional liquid crystal projector.
Figure 8:
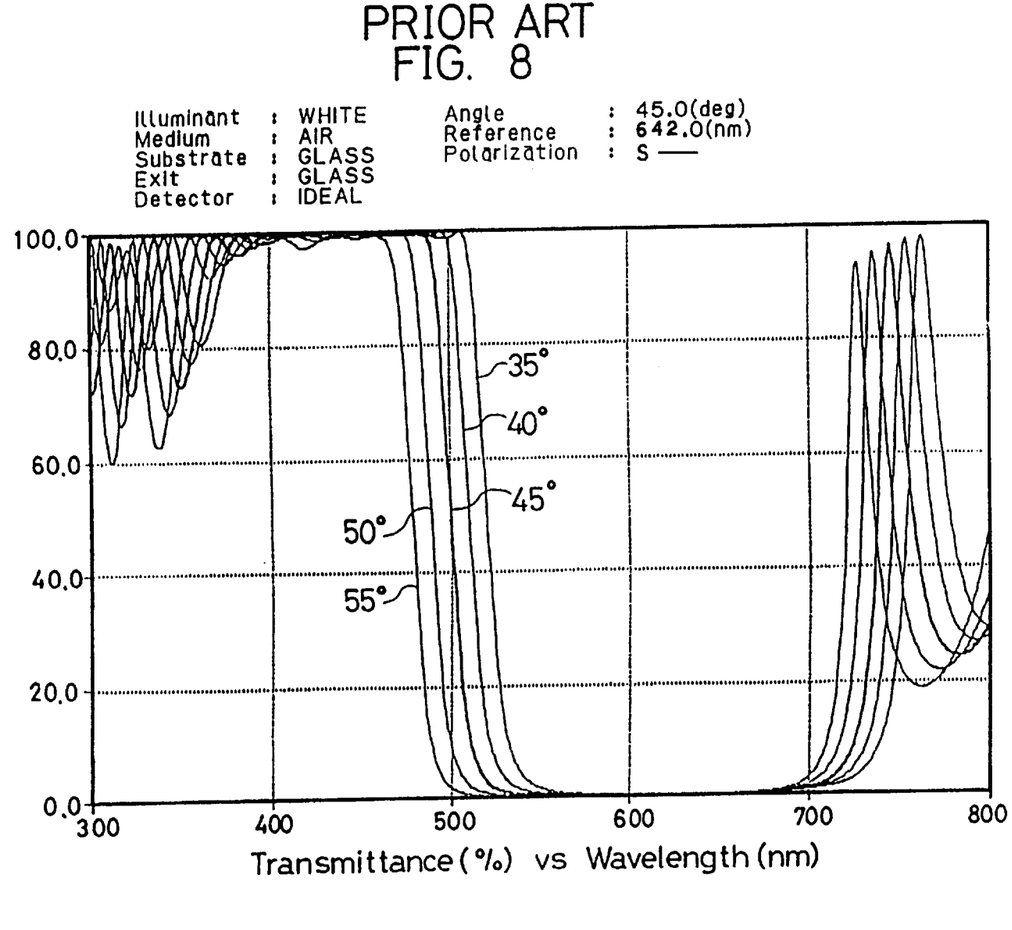
FIG 8 is a graph showing incident angle characteristics of the other dichroic mirror constituting the color separating optical system in terms of a relationship between transmittance and wavelength in the conventional liquid crystal projector.

Dichroic mirrors 58, 59 constituting a color separating optical system are disposed between the optical integrator and the field lens 56 to separate the white light rays into color light rays in the wavelength range of Red (R), Green (G), and Blue (B). Generally, spectral characteristics of the dichroic mirror 58 (59) exhibit an incident angle dependency as shown in FIGS. 7 and 8. In other words, the wavelength range of transmitted light or reflected light differs depending on the incident angle of light. Hereafter, this characteristic is referred to as "incident angle characteristic".

In the arrangement of the conventional liquid crystal projector, the two lamps 51, 52 are disposed immediately before the optical integrator. As shown in FIG. 6, parallel light rays of the upper lamp 51 are incident onto substantially the upper portion of the first lens array 53 while parallel light rays of the lower lamp 52 are incident onto substantially the lower portion of the first lens array 53. In this case, observing the light rays of the upper lamp 51 advancing to a center of the liquid crystal panel 57 or represented by the solid lines, these light rays are incident on the dichroic mirrors 58, 59 at an angle of (45°+α). On the other hand, observing the light rays of the lower lamp 52 advancing to the center of the liquid crystal panel 57 or represented by the broken lines, these light rays are incident on the dichroic mirrors 58, 59 at an angle of (45°−α).

As mentioned above, light rays of the upper lamp 51 are incident on the dichroic mirrors 58, 59 at an angle different from those irradiated of the lower lamp 52. Further, the dichroic mirrors 58, 59 have the incident angle characteristics. Accordingly, the problem is likely to occur that the display screen of the liquid crystal panel 57 is illuminated at a different color tone. For this reason, in the case where one of the lamps used, such as, the case where the lamps 51, 52 are alternately used, the case where one of the lamps 51, 51 should keep turning on after the other lamp is turned off under a certain circumstance during the use of both lamps 51, 52, or in the case where the luminance of the lamps 51, 52 differs from each other, the color tone of an optical image projected on the screen are likely to vary.

Also, it should be noted that unless the optical integrator is provided, it becomes more difficult to attain a luminance uniformity on the liquid crystal panel 57.

SUMMARY OF THE INVENTION

It is an object of the present invention to provide a light source device, an illuminator, and an image projector which have overcome the problems residing in the prior art.

According to an aspect of the present invention, a light source device comprises: a plurality of separate light sources which each irradiate light rays; and a light distributor which has a light incident surface and a light emerging surface, and receives light rays from each of the plurality of separate light sources on the light incident surface, and sends out light rays of each of the plurality of separate light sources parallel to a predetermined direction in a uniform distribution pattern from an entirety of the emerging surface.

According to another aspect of the present invention, an illuminator comprises: a plurality of separate light sources which each irradiate light rays; a light distributor which has a light incident surface and a light emerging surface, and receives light rays from each of the plurality of separate light sources on the light incident surface, and sends out light rays of each of the plurality of separate light sources parallel to a predetermined direction in a uniform distribution pattern from an entirety of the emerging surface; and an optical integrator which receives light rays from the light distributor, and send out enhanced light rays onto a target screen.

According to still another aspect of the present invention, an image projector comprises: a plurality of separate light sources which each irradiate light rays; a light distributor which has a light incident surface and a light emerging surface, and receives light rays from each of the plurality of separate light sources on the light incident surface, and sends out light rays of each of the plurality of separate light sources parallel to a predetermined direction in a uniform distribution pattern from an entirety of the emerging surface; an optical integrator which receives light rays from the light distributor, and send out enhanced light rays; a color separating optical system which separates light rays from the optical integrator into a plurality of color light rays based on the wavelength of light rays; a plurality of light valves which receive the plurality of color light rays from the color separating optical system, and respectively produces color optical images in accordance with an image signal; an image combiner which produces a combined optical image of color optical images produced by the plurality of light valves; and a projecting optical system which projects a combined optical image onto a screen.

These and other objects, features and advantages of the present invention will become more apparent upon a reading of the following detailed description and accompanying drawings.

DETAILED DESCRIPTION OF THE PREFERRED EMBODIMENTS OF THE INVENTION

Figure 1:
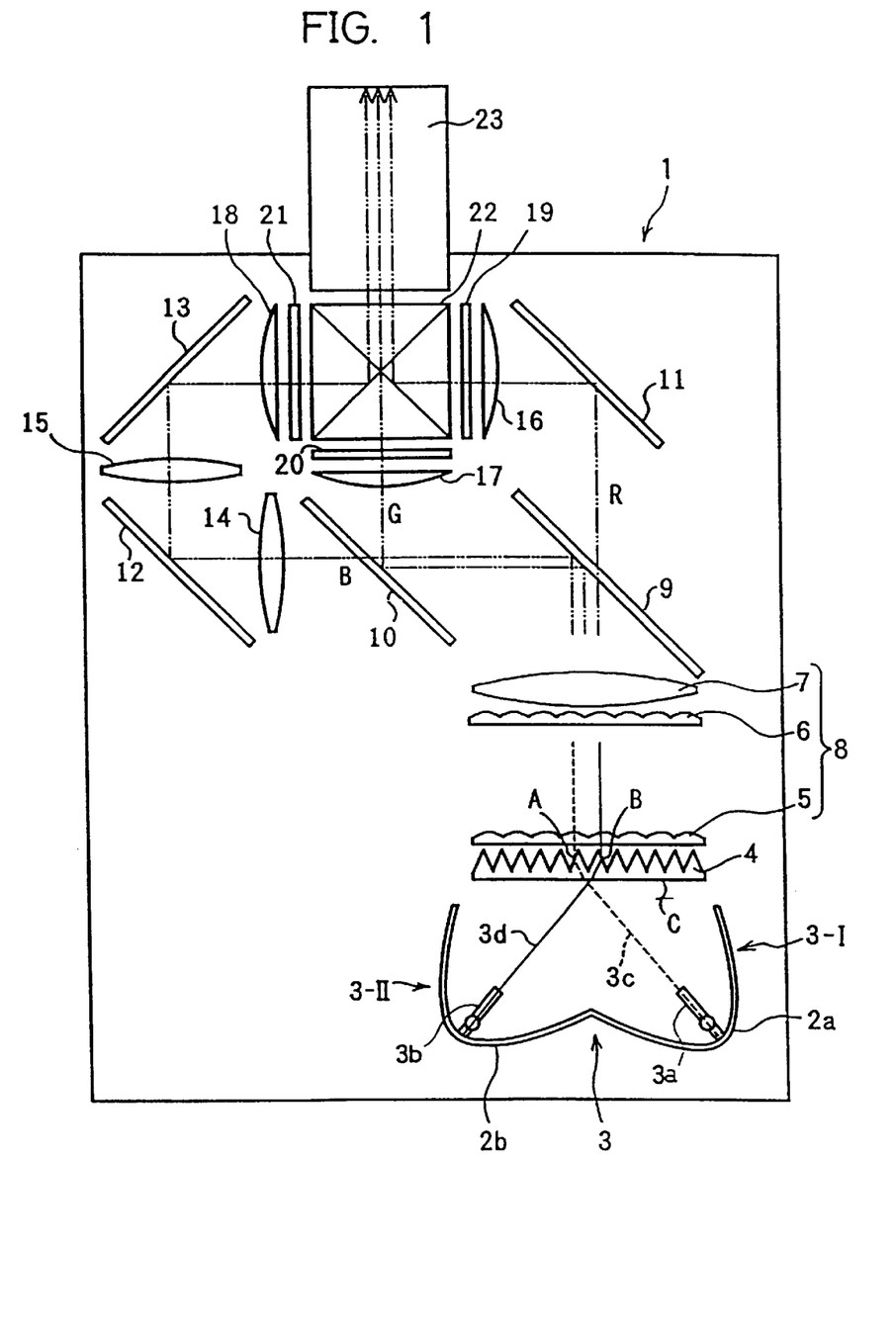
FIG. 1 is a schematic diagram showing a construction of a liquid crystal projector embodying the invention.

FIG. 1 shows a liquid crystal projector 1 embodying the invention. In FIG. 1, the liquid crystal projector 1 comprises a light source device 3 provided with a dual light system, a prism array 4, and an optical integrator 8 including a first lens array 5, a second lens array 6 and a integrating lens 7, a R-transmitting dichroic mirror 9, a B-transmitting dichroic mirror 10, deflecting mirrors 11, 12, 13, a relay optical system for an optical path of light in the wavelength range of Blue (B) including a condenser lens 14 and a relay lens 15, a field lens 16 for Red (R), a field lens 17 for Green (G), a field lens 18 for Blue (B), transmission type liquid crystal displays 19, 20, 21 for displaying a red image, a green image, and a blue image, respectively, a dichroic prism 22, and a projection lens 23.

The light source device 3 includes first and second lamp portions 3-I, 3-II. The first lamp portion 3-I has a lamp 3a and a reflector 2a, and the second lamp portion 3-II has a lamp 3b and a reflector 2b. The reflector 2a (2b) reflects light from the lamp 3a (3b).

Optical axes 3c, 3d of the lamps 3a, 3b are inclined at such an inclination to a center optical axis 3e (see FIG. 2) that light rays from each of the lamps 3a, 3b are incident onto an overall surface of the light incident surface C of the prism array 4. The lamp 3a (3b) is a metal halide lamp for irradiating white light. It is possible to use a xenon lamp or a halogen lamp.

The inner surface of the reflector 2a (2b) is made of a hyperbolic reflecting mirror. The reflector 2a (2b) reflects light rays from the lamp 3a (3b) placed in a focus position of the hyperbolic reflecting mirror by its inner surface in the inclination direction.

An IR-UV cut filter (not shown) is arranged at a front opening of the reflectors 2a, 2b for cutting off light components in an infrared spectrum and an ultraviolet spectrum and transmitting light components in a visible spectrum therethrough.

The prism array 4 includes a plurality of prism elements to pass light rays in the visible spectrum irradiated from the lamps 3a, 3b. Each of the first lens array 5 and the second lens array 6 include a plurality of lenses arrayed in a two-dimensional manner. The dichroic mirror 9 transmits light rays in the wavelength range of R while reflecting the other light rays. The dichroic mirror 10 transmits light rays in the wavelength range of B while reflecting the other light rays. The deflecting mirrors 11 to 13 deflect the optical path of the light from the light source device 3 by 90°. The liquid crystal panels 19, 20, 21 act as light valves for displaying an optical image of the respective colors. The dichroic prism 22 combines respective color optical images The projection lens 23 projects a combined optical image onto a screen.

Figure 2:
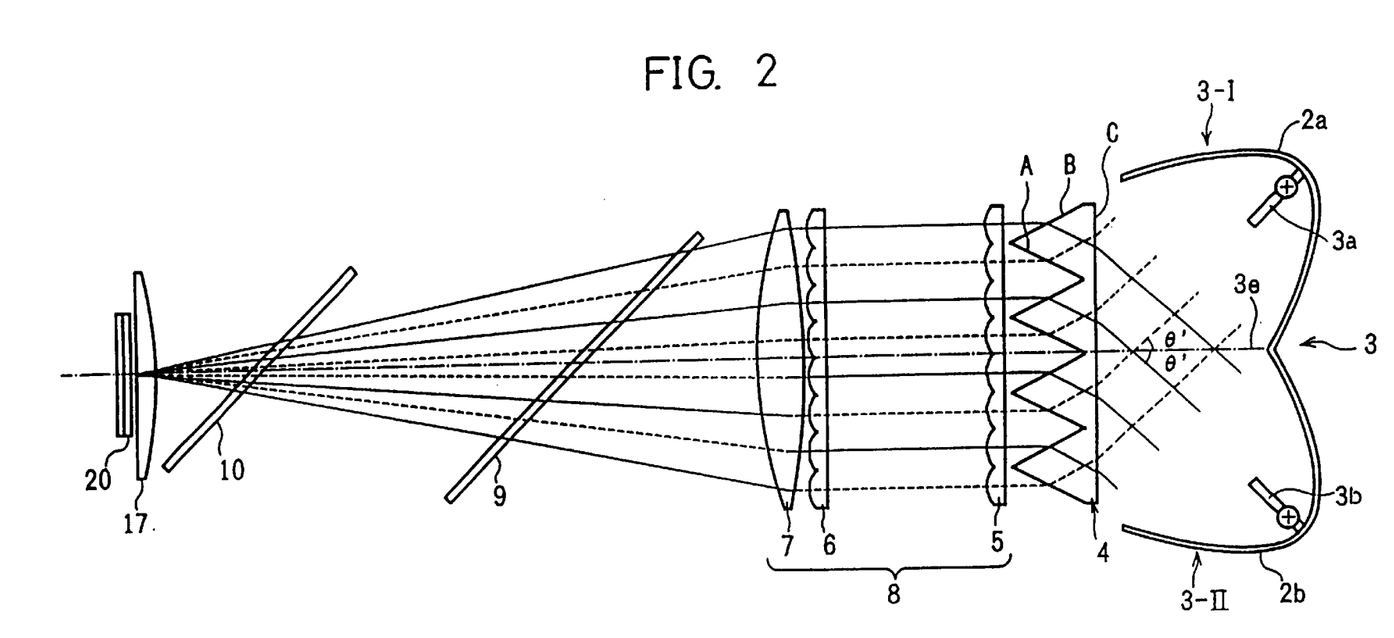
FIG. 2 is a schematic diagram showing a construction of an illumination optical system in the liquid crystal projector.

Referring to FIG. 2, the prism array 4 has a light incident surface (flat plane) C on one side thereof and a light emerging surface on the other side, the light emerging surface including combination of slanting surfaces A, B.

Reflected light rays from the lamp 3a are incident onto the entire flat surface C at the inclination angle and emerge parallel from the light emerging surface. Likewise, reflected light rays from the lamp 3b are incident on the entire flat surface C at the inclination angle and emerge parallel from the light emerging surface.

The light emerging surface of the prism array 4 is formed with slanting surfaces for each prism element. Apices of the prism elements are spaced at a predetermined interval or pitch. This pitch is hereinafter referred to as "pitch P of the prism array 4".

In the prism array 4, light rays from the lamps 3a, 3b are incident onto the entirety of the light incident surface C, and light rays from the lamp 3a emerge from the prism slanting surface A while light rays from the lamp 3b emerge from the prism slanting surface B. The light rays from the prism slanting surfaces A, B of the prism array 4 are incident upon an entire surface of the first lens array 5.

As seen from the above description, the prism array 4 receives light rays from the lamp 3a (3b) on the entire incident surface thereof, and transmits the received light rays from the entire emerging surface thereof while deflecting the received light rays into the direction parallel to the optical axis of the first lens array 5.

The first lens array 5 includes a plurality of lenses 5a, 5b (see FIG. 4) arrayed in a two-dimensional manner for converging light rays from the prism array 4. The second lens array 6 sends out light rays from the first lens array 5 on the display surface of the liquid crystal panel 19, 20, or 21 in a superposing manner to eliminate a luminance difference in a center portion and a peripheral portion of the display surfaces of the liquid crystal panels 19, 20, or 21, thereby making the luminance uniform.

The R-transmitting and B-transmitting dichroic mirrors 9 and 10 constitute a color separating optical system. Red rays in the wavelength range of R are separated by transmitting through the R-transmitting dichroic mirror 9 having a cutoff value at a wavelength of R. Green rays in the wavelength range of G are separated by being reflected by the R-transmitting dichroic mirror 9 and further reflected by the B-transmitting dichroic mirror 10. Blue rays in the wavelength range of B are separated by transmitting through the B-transmitting dichroic mirror 10 having a cutoff value at a wavelength of B. In this way, the rays of R, G, B are obtained by separating white light rays from the second lens array 6.

The field lenses 16, 17, 18 for R, G, B are adapted to telecentrically send out light rays of the respective colors separated by the R-transmitting and B-transmitting dichroic mirrors 9 and 10 onto the respective display surfaces of the liquid crystal panels 19, 20, 21.

The liquid crystal panels 19, 20, 21 for R, G, B respectively send out color optical images in accordance with image signals by modulating the luminance of light rays. The dichroic prism 22 includes R-, B-reflecting G-transmitting dichroic mirrors, and combines color optical images telecentrically by reflecting the red optical image and the blue optical image and transmitting the green optical image.

Next, a construction of the light source device 3 and the prism array 4 is described in detail. FIG. 2 is a schematic diagram of the illumination optical system of the liquid crystal display 1 in FIG. 1. It should be noted that only the field lens 17 and the liquid crystal panel 20 for a green optical image are shown in FIG. 2 for simplification.

As shown in FIG. 2, light rays from each of the lamp portions 3-I and 3-II are sent onto the entire light incident surface C of the prism array 4 at their respective inclination angles θ' to the center optical axis 3e. After being incident onto the light incident surface C, light rays (indicated by the broken lines in FIG. 2) from the lamp portion 3-I propagate through the prism array 4 parallel to the prism slanting surface B and emerge from the prism slanting surface A in the direction parallel to the center optical axis 3e.

On the other hand, light rays (indicated by the solid lines in FIG. 2) from the lamp portion 3-II propagate through the prism array 4 parallel to the prism slanting surface A and emerge from the prism slanting surface B in the direction parallel to the center optical axis 3e. The center optical axis 3e is the optical axis passing through the center of each of the liquid crystal panels 19, 20, 21, and perpendicularly intersecting each of the display surfaces of the liquid crystal panels 19, 20, 21.

In this way, illumination light rays of the lamps 3a, 3b emerge parallel from the prism array 4 at the interval corresponding to the pitch P of the prism array 4. In other words, parallel light rays of the lamp 3a and parallel light rays of the lamp 3b simultaneously emerge from the prism slanting surfaces A and the prism slanting surfaces B, respectively. Parallel light rays are incident onto the plural lenses 5a, 5b of the first lens array 5 acting as an optical integrating system, and the light rays from one lamp and the light rays from the other lamp alternately emerge from every two lens of the first lens array 5.

This is different from the conventional projector where light rays from the lamp 51 (or 52) are substantially incident onto the upper half portion (or lower half portion) of the first lens array 53 (see FIG. 6), thus eliminating the problem residing in the conventional illuminator that light rays sent out from separate lamps are likely to be incident on dichroic mirrors greater or smaller than a specified incident angle, e.g., 45°. In other words, light rays from the lamps 3a, 3b are incident onto the dichroic mirrors 9, 10 substantially at a predetermined incident angle, e.g., 45° in average, consequently avoiding the likelihood that a color tone difference occurs in a projected optical image. Elimination of color tone difference is advantageous in the case of turning on the two lamps alternately.

Figure 3:
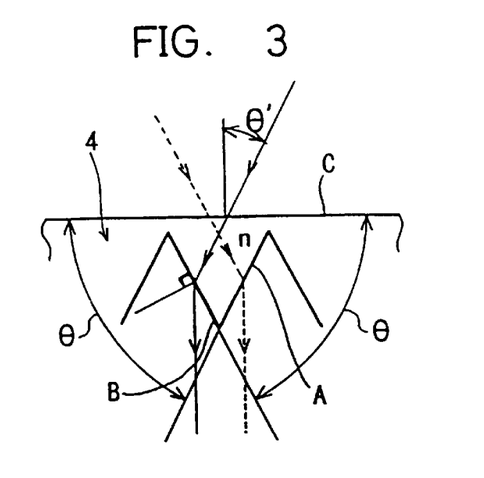
FIG. 3 is a schematic diagram partially showing prism slanting surfaces A and B of a prism array provided in the illumination optical system.
Figure 4:
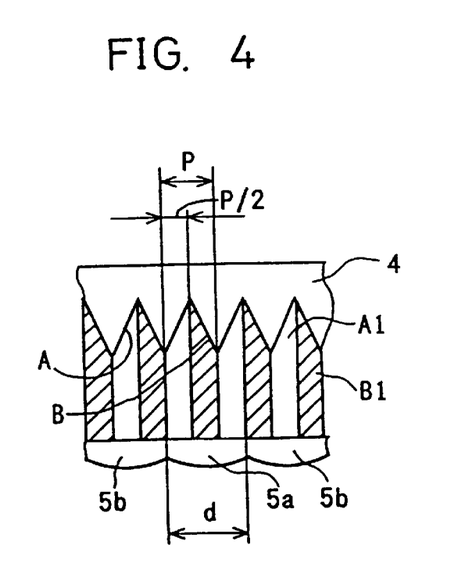
FIG. 4 is a schematic diagram partially showing a relationship between a pitch P between prism elements of the prism array and a dimension d of a lens of a first lens array provided in the illumination optical system.

FIG. 3 is a schematic diagram partially showing slanting surfaces A and B of each prism element of the prism array 4. FIG. 4 is a schematic diagram partially showing a relationship between the pitch P of prism elements of the prism array 4 and the lens dimension d of a lens of the first lens array 5.

As shown in FIG. 3, the slanting surfaces A, B constituting the light emerging side of the prism array 4 are continuously and alternately formed at an inclination θ to the flat surface C (light incident side). Assuming that the refractive index of the prism array 4 glass material is n, the inclination θ of the prism slanting surface A (B) to the flat surface C is expressed as the following Equation (1).

$$\theta = \sin^{-1}\left(\frac{1+\sqrt{8n^2+1}}{4n}\right) \qquad \text{[Equation 1]}$$

The incident angle θ' of the light ray of the lamp 3a (3b) to the flat surface C is so set as to satisfy Equation (2).

$$\theta' = \sin^{-1}\left\{n\cdot\sin\left[\sin^{-1}\left(\frac{1+\sqrt{8n^2+1}}{4n}\right) - \sin^{-1}\left(\frac{1+\sqrt{8n^2+1}}{4n^2}\right)\right]\right\} \qquad \text{[Equation 2]}$$

Setting the incident angle θ' to satisfy Equation (2) renders light rays from the lamp 3a (3b) incident onto the entire flat surface C at the incident angle θ', and then light rays parallel emerge from the prism slanting surfaces A (B) in the direction normal to the flat surface C (i.e., parallel to the center optical axis 3e). For example, in the case that the refractive index n of the prism array 4 is 1.472, the inclination angle θ is 63.8° and the incident angle θ' is 40.60°.

As shown in FIG. 4, a relationship between the pitch P of the prism array 4 and the dimension d of each of lenses 5a, 5b of the first lens array 5 is expressed as d=P·(N-½), wherein N denotes a positive integer (N=1, 2, 3, . . . ). In other words, the lens dimension d corresponds to a distance obtained by multiplying a half of the distance P by an odd number. FIG. 2 shows the case of N=1 where the lens dimension d is P/2 and there exists one prism slanting surface for each lens of the first lens array 5. FIGS. 1 and 4 show the case of N=2 where the lens dimension d is (3/2)P, and there exist three prism slanting surfaces for each lens of the first lens array 5.

Referring to FIG. 4, blank portions A1 between the light emerging side of the prism array 4 and the first lens array 5 represent regions through which light rays of the lamp 3a pass, while hatched portions B1 between the light emerging side of the prism array 4 and the first lens array 5 represent regions through which light rays of the lamp 3b pass.

The first lens array 5 includes a plurality of lenses as the lens 5a and the lens 5b arrayed alternately shown in FIG. 4. The dimension of lenses of the first lens array 5 is optically associated with the dimension of the liquid crystal panels 19, 20, 21.

Accordingly, on the lens 5a, light rays of the lamp 3b passing through the hatched portion B1 emerge from a center portion of the lens 5a, and are consequently incident onto a center portion of each of the liquid crystal panels 19, 20, 21, and light rays of the lamp 3a passing through the blank portion A1 emerge from a peripheral portion of the lens 5a, and are consequently incident onto a peripheral portion of each of the liquid crystal panels 19, 20, 21.

On the other hand, on the lens 5b, light rays of the lamp 3a passing through the blank portion A1 emerge from a center portion of the lens 5b, and are consequently incident onto a center portion of each of the liquid crystal panels 19, 20, 21, and light rays of the lamp 3b passing through the hatched portion B1 emerge from a peripheral portion of the lens 5b, and are consequently incident onto a peripheral portion of each of the liquid crystal panels 19, 20, 21.

In this way, light rays of the lamp 3a and light rays of the lamp 3b sent out from the first lens array 5 uniformly and superposingly illuminate the dichroic mirrors 9, 10, and then to the liquid crystal panels 19, 20, 21. Accordingly, the entirety of the display surfaces of the liquid crystal panels 19, 20, 21 is illuminated uniformly.

However, it should be noted that in the case of the equation $d=P\cdot(N-\frac{1}{2})$ being not attained, a non-uniform illumination onto the liquid crystal panels occurs. Specifically, when both the lamps 3a, 3b are activated under the condition of d=P, light rays of the lamp 3b pass through one half of each lens of the first lens array 5 and illuminate one half of each of the liquid crystal panels 19, 20, 21. Also, light rays of the lamp 3a pass through the other half of each lens of the first lens array 5 and illuminate the other half of each of the liquid crystal panels 19, 20, 21. Consequently, each of the liquid crystal panels 19, 20, 21 is illuminated half and half by light rays of the lamps 3a and 3b, respectively. Further, if only one of the two lamps 3a and 3b is activated under the above condition, only one half of the liquid crystal panel 19, 20, or 21 is illuminated by light rays of an activated lamp.

The dichoric prism 22 combines a red optical image sent out from the liquid crystal panel 19, a green optical image sent out from the liquid crystal panel 20, and a blue optical image sent out from the liquid crystal panel 21, which are produced by luminance modulation. A combined optical image is projected on a screen (not shown) in an enlarged image via the projection lens 23.

As mentioned above, light rays of each of the lamps 3a, 3b are incident onto the entire incident surface of the prism array 4, and sent out from the prism array 4 in the direction parallel to the optical axis of the liquid crystal panels 19, 20, 21. Parallel light rays sent out from the prism array 4 are integrated into a number of light rays by the plural lenses 5a, 5b of the first lens array 5, the second lens array 6, and the integrating lens 7, and then separated into rays of R, G, B by the color separating optical system including the dichroic mirrors 9, 10. Thereafter, the rays of R, G, B are directed onto the respective display surfaces of the liquid crystal panels 19, 20, 21 via the field lenses 16, 17, 18 in the superposing manner.

Light rays of the lamp 3a and light rays of the lamp 3b are incident on the dichroic mirrors 9, 10 substantially at the same incident angle in average. This will eliminate a color tone difference, which is liable to occur due to the condition that light rays of the lamps 3a, 3b are respectively sent out from two half portions of the lens array.

Also, the two lamps 3a, 3b can be used more efficiently, thereby providing an illumination optical system with higher performance. The above arrangement makes it possible to turn over the lamps 3a, 3b alternately by a changeover device to prolong the life of the lamp. Even in the case that only one lamp is activated, there can be suppressed a color tone difference in a projected image because light rays of the one lamp is incident onto an entire surface of the first lens array 5 of the optical integrator.

Furthermore, even if the respective luminances of the lamps 3a and 3b are different, there is no likelihood that a non-uniformity occurs in the luminance of a projected image because light rays of the lamps 3a and 3b are superposed or mixed uniformly on the liquid crystal panels 19, 20, 21.

The lens dimension d of the first lens array 5 is set at a value which is obtained by multiplying P/2 and an odd number, wherein P denotes the pitch of the prism array 4. Reflected light rays of the lamps 3a, 3b are incident on the entire light incident surface C of the prism array 4, and parallel light rays of the lamps 3a, 3b emerge from the slanting surfaces A, B of the prism array 4 at the predetermined alternate intervals to uniformly superposingly illuminate the liquid crystal panels 19, 20, 21. Thus, uniform illumination of the liquid crystal panels 19, 20, 21 is attained.

Next, alternative dual light system light source devices will be described with reference to FIGS. 5A and 5B. In these light source devices, two lamps are provided, and one of the two lamps is used while having the other lamp suspended. When the life of the one lamp expires, the other lamp is placed into work. This ensures a prolonged illumination life of a light source device.

Figure 5A:
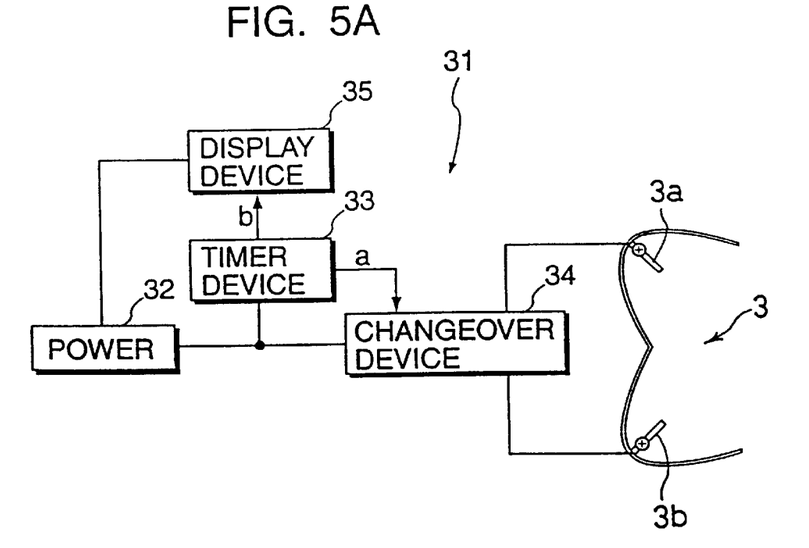
FIGS. 5A and 5B are block diagrams showing a construction of another light source device for the liquid crystal projector, specifically FIG. 5A showing a construction of a light source device provided with an automatic changeover system, FIG. 5B showing a construction of a light source device provided with a manually operated changeover system.
Figure 5B:
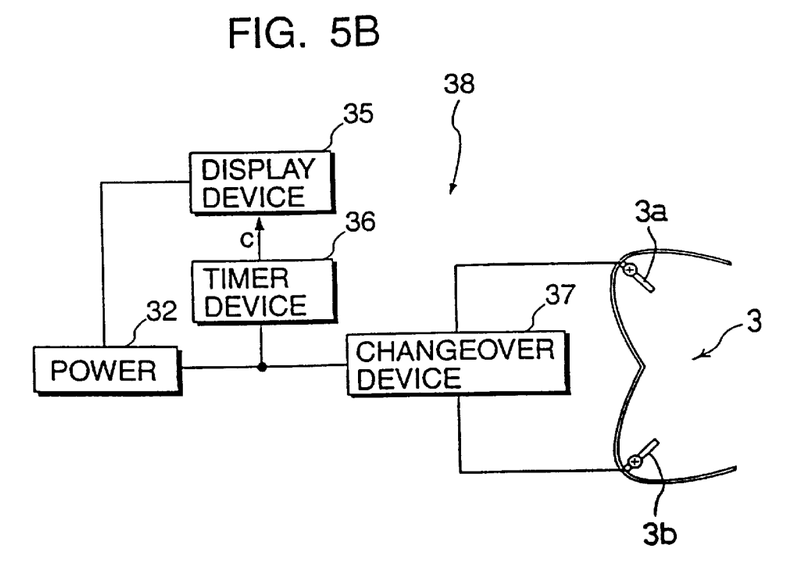

Specifically, FIG. 5A shows a light source device provided with an automatic changeover system, and FIG. 5B shows a light source device provided with a manual changeover system. Constituent elements identical to those in the foregoing embodiment are denoted with the same reference numerals, and description thereof is omitted herein.

In the light source device shown in FIG. 5A, there is provided a light source changeover control system 31 including a power supply 32, a timer device 33, a changeover device 34, and a display device 35. The power supply 32 selectively supplies power to lamps 3a, 3b. The lamp 3a is first activated as a first lamp and the lamp 3b acts as a second lamp or a spare lamp.

The timer device 33 is connected to the power supply 32 and counts up an illumination operable life of the lamp 3a and outputs a time-up signal a to the changeover device 34 when the illumination operable life lapses. The changeover device 34 is connected to the power supply 32 to changeover the power supply from the lamp 3a to the lamp 3b upon receiving the time-up signal a. Also, the timer device 33 outputs an alert signal b to the display device 35 when a device operation time equal to twice the illumination operable life expires. The display device 35 is connected to the power supply 32 and displays a warning message such as flickering light and/or outputs an alert sound upon receiving the alert signal b from the timer device 33 to indicate that the life of the lamp 3b comes to end.

More specifically, the timer device 33 and the display device 35 constitute an alert device. The alert device counts up the device operation time including the illumination operable life of the lamp 3b, and outputs the alert signal b when the device operation time lapses.

The timer device 33 comprises a timer and a counter. An estimative time corresponding to the illumination operable life (or simply referred to as "limit time") of a lamp is stored in the timer device 33 in advance. After the lapse of the illumination operable life, the luminance of the light source device 3 noticeably decreases because the life of the lamp 3a (or 3b) has come to end. The life of the lamp 3a is judged to have come to end when the illumination operable life of the lamp 3a reaches the limit time, and the time-up signal a (changeover signal) is sent to the changeover device 34 to change over the power supply from the lamp 3a to the lamp 3b. The life of the lamp 3b is judged to have come to end when the device operation time lapses, and the alert signal b is sent to the display device 35 to display a warning message or output an alert sound.

Alternatively, it may be appreciated that the timer device 33 is set with a limit time corresponding to the illumination operable life of the lamp 3b separately from the illumination operable life of the lamp 3a, in place of counting up the device operation time corresponding to twice of the illumination operable life, and the alert signal b is sent to the display device 35 when the illumination operable life of the lamp 3b lapses. Further, as an altered arrangement, the timer device 33 may reset the limit value when the changeover device 34 switches the power supply from the lamp 3a to the lamp 3b or vice versa.

The display device 35 comprises a red LED and a green LED and to selectively turns on the red LED and the green LED. Specifically, upon receiving the alert signal b from the timer device 33, the display device 35 is controlled to turn on the red LED. The changeover from the green LED to the red LED is performed by a switch device (not shown) which is provided in the display device 35 and is operated upon receiving the alert signal b. When the red LED is turned on, the user is alerted of the fact that the light amount of the lamp 3b decreases and that replacement of the lamp is necessary. When the replacement of the lamp is completed and the timer device 33 is reset, the light source device 3 is restored to the initial state where the timer device 33 is ready for counting up the illumination operable life to restart illumination of the light source 3. The display device 35 may be constituted solely by a red LED.

As mentioned above, the power supply is automatically changed from the lamp 3a to the lamp 3b when the illumination operable life lapses (before the light amount of the lamp 3a diminishes), and a warning message or an alert sound is generated when the illumination operable life of the lamp 3b lapses (before the light amount of the lamp 3b diminishes) to alert the user of the necessity of lamp replacement. Accordingly, the life of the light source device 3 can be doubled, and the number of lamp replacements, which is cumbersome for the user, can be reduced to approximately one half. Further, since a warning message or an alert sound is generated to alert a lamp replacement, the user can securely execute the lamp replacement at a proper time.

Light from the lamps 3a, 3b is projected on each of the display surfaces of liquid display panels 19, 20, 21 via a prism array 4 and an optical integrator 8 at alternate different positions in a superposing manner to illuminate the display surfaces uniformly.

In the light source device shown in FIG. 5A, when the life of the lamp 3a comes to end, the changeover device 34 changes the power supply from the lamp 3a to the lamp 3b. Alternatively, in the light source device shown in FIG. 5B, there is provided a light source changeover control system 38. In this system, an alert signal c is outputted to the display device 35 when a timer device 36 counts up an illumination operable life corresponding to the life of the lamp 3a to turn on the red LED of the display device 35 to alert the user of the necessity of lamp replacement. Upon receiving a warning message or an alert sound, the user manually operates a changeover device 37 to change the power supply from the lamp 3a to the lamp 3b. In this case, the timer device 36 is reset when the user manually operates the changeover device 37, thereby allowing the timer device 36 to count up the illumination operable life of the lamp 3b and output the alert signal c to the display device 36 when the illumination operable life of the lamp 3b lapses. The display device 35 is controlled to display a warning message or output an alert sound by turning on the red LED and the like, thereby alerting the user of the necessity of lamp replacement. At this time, to distinguish the necessity of lamp replacement and the necessity of lamp changeover, the display device 35 may be provided with a sound generator such as a volume-adjustable buzzer as well as the red LED to alert the user of the necessity of lamp replacement or lamp changeover by an audio sound generated by the audio generator. Alternatively, two red LEDs may be provided and so constructed that one red LED is turned on to alert the necessity of lamp changeover and both of the red LEDs are turned on to alert the necessity of lamp replacement, or vice versa.

The changeover of power supply from the lamp 3a to the lamp 3b is automatically executed in accordance with the limit time set in the timer device 33. Alternatively, a light amount sensor may be provided near the dual light system light source device 3 to control the changeover device 34 to change over the power supply from the lamp 3a to the lamp 3b when the light amount of the lamp 3a falls below a predetermined value. This enables the user to be notified of the lamp replacement even when a breakdown occurs in the circuit of the lamp.

In the foregoing embodiment, a transmission type liquid crystal panel is used as the light valve. Alternatively, a reflective liquid crystal panel or a reflective modulating display device may be used as the light valve.

In the foregoing embodiment, the prism array 4 is provided as a light distributor which is operable to receive light rays from a lamp on an incident surface, and send out received light rays so as to propagate in a direction parallel to an optical axis of an illuminator in a uniform distribution, and uniformly illuminate an entire incident surface of a lens array of an optical integrator by parallel light rays. However, it may be appreciated to use other optical elements in stead of the prism array, for example, a diffraction optical device having a predetermined diffraction pattern.

As mentioned above, respective light rays of lamps are incident onto an entire incident surface of a light distributor which in turn sent out parallel light rays onto an entire incident surface of a lens array provided in an optical integrator. Light rays sent from the optical integrator are incident onto a color separating optical system having an incident angle characteristic in the uniform superposing manner and substantially at the same incident angle in average. This will assuredly prevent a color tone difference due to an incident angle difference between light rays of the two lamps.

Light rays sent out from the lens arrays are separated into color light rays, and the respective color light rays are then incident onto each of the display surfaces of the light valves uniformly superposingly, thereby eliminating the luminance non-uniformity. Accordingly, even in a case where one of the lamps is replaced with a new one, or there is a luminance difference between two lamps, there will not occur any non-uniformity in the illumination of the crystal liquid panels or any color tone difference in the projected image.

In connection with the prism array, it may be preferable to set the lens dimension of the lens array at a value which is obtained by multiplying P/2 and an odd number, wherein P denotes a pitch of prism elements of the prism array. Light rays from two lamps illuminates the entire surface of the light valve in such a manner that light rays from one lamp and light rays from the other lamp alternately illuminate the surface of the light valve. Accordingly, the entirety of the surface of the light valve can be uniformly illuminated. A luminance non-uniformity in a projected image can be suppressed.

Alternatively, two lamps are changed over to prolong the life of the light source device, thereby decreasing cumbersome lamp replacement. Specifically, the user is alerted that the illumination operable life of a lamp in instant use comes to end by an alert sound or a warning message, thereby making it possible for the user to change a power supply from the used-up lamp to a spare lamp manually at a proper time. Alternatively, the power supply from a used-up lamp is automatically changed to another lamp acting as a spare lamp upon lapse of the illumination operable life of the used-up lamp without notifying the user of the life lapse of the instant lamp.

In this case, also, by displaying a warning message or outputting an alert sound upon lapse of the illumination operable life of a spare lamp to alert the user of the necessity of lamp replacement, thereby the user can accurately know the replacement timing of lamps for the light source device.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A light source device comprising:
   a plurality of separate light sources for irradiating light rays, an optical axis of each of the plurality of separate light sources being non-parallel to an optical axis of any other of the plurality of separate light sources; and
   a light distributor having a light incident surface and a light emerging surface, the light distributor for receiving light rays from each of the plurality of separate light sources on the light incident surface, and for transmitting light rays of each of the plurality of separate light sources parallel to a predetermined direction in a uniform distribution pattern from an entirety of the light emerging surface.

2. A light source device according to claim 1, wherein each of the plurality of separate light sources irradiates light rays in a direction inclined with respect to the light incident surface of the light distributor so that light rays irradiated by each of the plurality of separate light sources are incident onto the entire light incident surface of the light distributor.

3. A light source device according to claim 1, wherein the light distributor includes a prism array including a plurality of prism elements.

4. A light source device according to claim 3, wherein each prism element has light emerging surfaces slanting in symmetrical directions to each other with respect to the predetermined direction.

5. A light source device according to claim 2, wherein each of the plurality of separate light sources irradiates light rays parallel to the direction inclined with respect to the light incident surface of the light distributor.

6. A light source device according to claim 1, wherein each of the plurality of separate light sources includes:
   a reflector for reflecting light rays, the reflector having a hyperbolic reflecting surface with a focus position; and
   a lamp for irradiating light rays, the lamp being positioned in the focus position of the hyperbolic reflecting surface.

7. A light source device according to claim 1, wherein each of the plurality of separate light sources are activated at the same time.

8. A light source device according to claim 1, wherein each of the plurality of separate light sources is activated sequentially in accordance with a predetermined condition.

9. An illuminator comprising:
   a plurality of separate light sources for irradiating light rays, an optical axis of each of the plurality of separate light sources being non-parallel to an optical axis of any other of the plurality of separate light sources;
   a light distributor having a light incident surface and a light emerging surface, the light distributor for receiving light rays from each of the plurality of separate light sources on the light incident surface, and for transmitting light rays of each of the plurality of separate light sources parallel to a predetermined direction in a uniform distribution pattern from an entirety of the light emerging surface; and
   an optical integrator for receiving light rays from the light distributor, and for transmitting light rays onto a target screen.

10. An illuminator according to claim 9, wherein each of the plurality of separate light sources irradiates light rays in a direction inclined with respect to the light incident surface of the light distributor so that light rays irradiated by each of the plurality of separate light sources are incident onto the entire light incident surface of the light distributor.

11. An illuminator according to claim 9, wherein the light distributor includes a prism array including a plurality of prism elements.

12. An illuminator according to claim 11, wherein each prism element has light emerging surfaces slanting in symmetrical directions to each other with respect to the predetermined direction.

13. An illuminator according to claim 11, wherein the optical integrator includes a lens array including a plurality of lenses arranged on a plane perpendicularly intersecting the predetermined direction.

14. An illuminator according to claim 13, wherein a dimension d of each lens of the optical integrator has the following relationship with a dimension P of each prism element of the prism array:

$$d = P \cdot (N - \tfrac{1}{2})$$

wherein N denotes an integer.

15. An illuminator according to claim 9, wherein each of the plurality of separate light sources are activated at the same time.

16. An illuminator according to claim 9, wherein each of the plurality of separate light sources is activated sequentially in accordance with a predetermined condition.

17. An illuminator according to claim 10, wherein each of the plurality of separate light sources irradiates light rays parallel to the direction inclined with respect to the light incident surface of the light distributor.

18. An illuminator according to claim 9, wherein each of the plurality of separate light sources includes:
   a reflector for reflecting light rays, the reflector having a hyperbolic reflecting surface with a focus position; and
   a lamp for irradiating light rays, the lamp being positioned in the focus position of the hyperbolic reflecting surface.

19. An image projector comprising:
   a plurality of separate light sources for irradiating light rays, an optical axis of each of the plurality of separate light sources being non-parallel to an optical axis of any other of the plurality of separate light sources;
   a light distributor having a light incident surface and a light emerging surface, the light distributor for receiving light rays from each of the plurality of separate light sources on the light incident surface, and for transmitting light rays of each of the plurality of separate light sources parallel to a predetermined direction in a uniform distribution pattern from an entirety of the light emerging surface;

an optical integrator for receiving light rays from the light distributor, and for transmitting light rays;

a color separating optical system for separating light rays from the lens array optical integrator into a plurality of color light rays based on a wavelength of light rays;

a plurality of light valves for receiving the plurality of color light rays from the color separating optical system, and for producing respective color optical images in accordance with an image signal;

an image combiner for producing a combined optical image of color optical images produced by the plurality of light valves; and a projecting optical system for projecting the combined optical image onto a screen.

20. An image projector according to claim 19, wherein the light distributor includes a prism array including a plurality of prism elements.

21. An image projector according to claim 20, wherein each prism element has light emerging surfaces slanting in symmetrical directions to each other with respect to the predetermined direction.

22. An image projector according to claim 20, wherein the optical integrator includes a lens array including a plurality of lenses arranged on a plane perpendicularly intersecting the predetermined direction, and a dimension d of each lens of the optical integrator has the following relationship with a dimension P of each prism element of the prism array:

$$d = P \cdot (N - \tfrac{1}{2})$$

wherein N denotes an integer.

* * * * *